3,644,431
DIGLYCIDYL ESTERS OF ALIPHATIC
DICARBOXYLIC ACIDS
Alfred Heer, Birsfelden, and Werner Schaffner, Basel, Switzerland, assignors to Ciba Limited, Basel, Switzerland
No Drawing. Filed Sept. 19, 1969, Ser. No. 859,578
Claims priority, application Switzerland, Sept. 30, 1968, 14,560/68
Int. Cl. C07d 1/18
U.S. Cl. 260—348 A                     10 Claims

ABSTRACT OF THE DISCLOSURE

New diglycidyl esters of branched-chain paraffin-dicarboxylic acids, the carboxyl groups of which are linked by a linear $C_1$–$C_{10}$-alkylene chain which is substituted by 2 to 6 $C_1$–$C_4$-alkyl groups, above all technical trimethyladipic acid diglycidyl ester. Compared to the known adipic acid diglycidyl esters, the new diglycidyl esters inter alia possess the advantages of storage stability, of greater difficulty of saponification of the ester groups and of lesser water absorption of the cured mouldings. The relatively low curing temperatures required with the usual hot-curing agents (for example 60–70° C. with hexahydrophthalic anhydride) are surprising. Trimethyladipic acid diglycidyl ester is above all suitable for use as reactive diluent for other epoxide resins, because in contrast to the known diluents the mechanical properties of the cured mouldings are not worsened, but on the contrary, are improved.

Diglycidyl esters of straight-chain dicarboxylic acids such as adipic acid or sebacic acid are described in the literature.

It has now been found that certain diglycidyl esters or di-β-methylglycidyl esters of branched-chain aliphatic dicarboxylic acids, which have hitherto not been described, and in particular above all the liquid, low-viscosity trimethyladipic acid diglycidyl ester (technical isomer mixture of 2,2,4- and 2,4,4-trimethyladipic acid diglycidyl ester) are distinguished by a whole series of unexpected technical advantages relative to the known diglycidyl esters of straight-chain dicarboxylic acids such as for example adipic acid diglycidyl ester or sebacic acid diglycidyl ester. They are storage-stable and as a rule do not crystallise out, even in the pure form; their ester groups are much more difficult to saponify and to modify in other ways (for example by transamidation on curing with amines) and the cured mouldings produced from the new diglycidyl esters or di-β-methylglycidyl esters show a lesser water absorption. The moldings cured with polycarboxylic acid anhydrides or polyamines possess excellent mechanical and electrical porperties. In addition, trimethyladipic acid diglycidyl ester is also suitable for use as a reactive diluent for other epoxide resins. Curing with carboxylic acid anhydrides is already possible at unusually low temperatures (for example at 60 to 70° C. in 12 hours with hexahydrophthalic anhydride and accelerator).

In the recent past, reactive diluents have primarily been assessed on the basis of their viscosity-lowering properties on addition to liquid resins. On the other hand, today further properties are to an increasing extent being regarded as equally important. The viscosity of the curable epoxide resin mixtures should be lowered without the properties before, during or after cure being worsened. The desired reactive diluents should have a low vapour pressure and should be as non-toxic as possible. They should be compatible with the epoxide resin and should yield storable resin components. The known reactive diluents only partially meet these requirements and additionally most of them are toxicologically not harmless.

The best-known group, the polyglycidyl ethers of polyalcohols with less than 5 carbon atoms (for example 1,4-butanediol-diglycidyl ether) produce dermatosis and are toxic; they are furthermore only obtained in moderate purity (high chlorine contents) when manufactured industrially. On the other hand, adipic acid diglycidyl ester, which has been known for a considerable time, has not found any greater use in practice since it crystallises already after being left to stand for a short time, and additionally the water absorption of cured mouldings manufactured therefrom is too high. Against this, trimethyladipic acid diglycidyl ester is not only very effective as a viscosity-lowering agent, but at the same time the mechanical properties of the mouldings obtained after curing are only slightly affected relative to the unmodified epoxide resins. Furthermore the vapour pressure of this compound is very low, and the compound is physiologically harmless. The combination of methyl side-groups and of polar epoxide groups in the molecule results in a surface-active effect. The epoxide resins diluted with trimethyladipic acid diglycidyl ester as a result have a lower surface tension and hence better flow, better flow control and better wettability than is the case with known and comparable other additives which give an equally low viscosity.

Certain homologous diglycidyl esters of branched-chain aliphatic dicarboxylic acids have similar advantageous technical properties as trimethyladipic acid diglycidyl ester.

The subject of the present invention are thus new diglycidyl esters or di-β-methylglycidyl esters derived from branched-chain aliphatic dicarboxylic acids, of general formula:

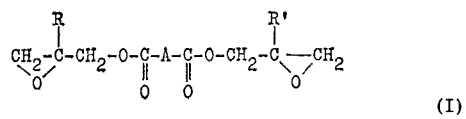

(I)

wherein A denotes a linear $C_1$–$C_{10}$-alkylene chain preferably a $C_3$–$C_{10}$-polymethylene residue which is substituted by 2 to 6 $C_1$–$C_4$-alkyl groups and R and R' each denote a hydrogen atom or a methyl group.

The new diglycidyl esters or di-β-methylglycidyl esters of Formula I can be manufactured by reacting a dicarboxylic acid or its salt of formula

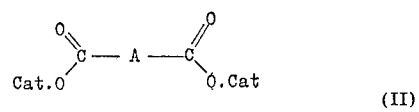

(II)

wherein A has the same significance as in Formula I and "Cat" denotes a cation, preferably a hydrogen atom or alkali metal, in one stage or several stages, in a manner which is in itself known, with an epihalogenohydrin or β-methylepihalogenohydrin with elimination of "Cat.Hal," wherein "Hal" denotes the halogen atom of the epihalogenohydrin or of the β-methylepihalogenohydrin.

For example, the procedure which can be followed is to react alkali salts of the dicarboxylic acid, such as for example the disodium salt of trimethyladipic acid, at elevated temperature with an excess of the epihalogenohydrin or of the β-methylepihalogenohydrin, such as epichlorhydrin or β-methylepichlorhydrin, to filter off the inorganic salt which has separated out, and to distil off the excess epichlorhydrin or β-methylepichlorhydrin.

Furthermore, the dicarboxylic acid in the form of the free acid can be reacted in a single stage with an excess of the epihalogenohydrin or of the β-methylepihalogenohydrin, that is to say as a rule in an amount of more than 2 mols per free carboxyl group, in the presence of suitable catalysts such as for example tertiary amines, quaternary ammonium salts or ion exchange resins, to give the glycidyl ester. In this reaction, the corresponding halogenohydrin or β-methylhalogenohydrin ester of the dicarboxylic acid is first formed by addition of the epihalogenohydrin or of the β-methylepihalogenohydrin to the carboxyl groups of the free dicarboxylic acid. The excess epihalogenohydrin or β-methylhalogenohydrin then eliminates hydrogen halide from the halogenohydrin or β-methylhalogenohydrin ester groups, with the formation of glycidyl or di-β-methylglycidyl ester groups and of an equivalent quantity of glycerine-dihalogenohydrin or β-methylglycerine-dihalogenohydrin. The latter are distilled off after completion of the reaction together with epihalogenohydrin or β-methylepihalogenohydrin, and can be regenerated to the epihalogenohydrin or β-methylepihalogenohydrin by treatment with strong alkalis. Such a single-stage catalytic process is for example described in German patent specification 1,165,030. The process suffers from the disadvantage of yielding relatively impure products which because of major proportions of halogenohydrin esters possess a relatively low epoxide oxygen content and a high halogen or chlorine content.

Preferably, the new glycidyl esters or di-β-methylglycidyl esters of Formula I according to the invention are manufactured by reacting an epihalogenohydrin or β-methylepihalogenohydrin, preferably epichlorhydrin or β-methylepichlorhydrin, in the presence of a catalyst such as preferably a tertiary amine or a quaternary ammonium base or a quaternary ammonium salt, with a dicarboxylic acid of Formula II (Cat=H), and treating the resulting product containing halogenohydrin groups with reagents which split off hydrogen halides.

Suitable catalysts for the addition of epichlorhydrin or β-methylepichlorhydrin are above all tertiary amines such as triethylamine, tri-n-propylamine, benzyldimethylamine, N,N′-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate and methyltriethylammonium chloride; further, ion exchange resins having tertiary or quaternary amino groups; further, trialkylhydrazonium salts, such as trimethylhydrazonium iodide.

Further suitable catalysts are also low molecular thioethers and sulphonium salts or compounds which can be converted into thioethers or sulphonium compounds with the epihalogenohydrin or β-methylepihalogenohydrins, such as hydrogen sulphide, sodium sulphide or mercaptans.

As such thioethers or sulphonium salts there may be mentioned: diethylsulphide, β-hydroxyethylethylsulphide, β-hydroxypropylethylsulphide, ω-hydroxy-tetramethyleneethylsulphide, thiodiglycol, mono-β-cyanoethylthioglycolether, dibenzylsulphide, benzylethylsulphide, benzylbutylsulphide, trimethylsulphonium iodide, tris(β-hydroxyethyl)sulphonium chloride, dibenzylmethylsulphonium bromide, 2,3 - epoxypropylmethylethylsulphonium iodide, dodecylmethylsulphide and dithian.

Strong alkalis such as anhydrous sodium hydroxide or aqueous sodium hydroxide solutions are as a rule used for the dehydrohalogenation, but other alkaline reagents such as potassium hydroxide, barium hydroxide, calcium hydroxide, sodium carbonate or potassium carbonate can also be employed.

In turn, the dehydrohalogenation can be carried out in several stages. Thus it is possible first to carry out a treatment with solid sodium or potassium hydroxide at elevated temperature and after distilling off the excess epihalogenohydrin or β-methylepihalogenohydrin to heat the material in an inert solvent with a less than equivalent amount of concentrated alkali hydroxide solution, for example 50% strength sodium hydroxide solution, as is described in German displayed specification 1,211,177.

Possible epihalogenohydrins or β-methylepihalogenohydrins are epibromhydrin and above all epichlorohydrin and β-methylepichlorhydrin. Good yields are obtained if an excess of epichlorhydrin or β-methylepichlorhydrin and in particular preferably 4 to 40 mols of epichlorhydrin or β-methylepichlorhydrin are used per carboxyl group. During the first reaction, before the addition of alkali, a partial epoxidation of the bis-chlorhyrin ester of the dicarboxylic acid (II) already takes place. The epichlorhydrin or the β-methylepichlorhydrin which act as a hydrogen chloride acceptor are at the same time partially converted into glycerinedichlorhydrin or β-methylglycerinedichlorhydrin. These are again regenerated on treatment with alkali to give epichlorhydrin or β-methylchlorhydrin.

As branched-chain aliphatic dicarboxylic acids of Formula II [Cat=H] which serve as starting substances for the manufacture of the new diglycidyl esters or di-β-methylglycidyl esters of Formula I, there may be mentioned: 2,2-dimethylmalonic and 2,2-diethylmalonic acid, 2,2-dimethylglutaric and 2,2-diethylglutaric acid, 2,3-, 2,4-, 2,5- and 3,4-dimethyladipic acid, 2,5-diethyladipic acid; α,α′-di ($C_1$–$C_4$)-alkyl-paraffin-dicarboxylic acids such as are for example accessible by double malonic ester synthesis from 2 mols of $C_1$–$C_4$-alkyl substituted malonic esters and 1 mol of ω,ω′-dihalogenalkanes and subsequent decarboxylation, such as for example 2,7-dibutylsuberic acid and 2,9-dimethylsebacic or 2,9-dibutylsebacic acid; β,β′-di($C_1$–$C_4$)alyl-paraffin-dicarboxylic acids which can for example be manufactured starting from α,α′-dialkyl-paraffin-dicarboxylic acids with 2 C-atoms fewer in the paraffin chain according to the Arndt-Eistert synthesis by reaction of the corresponding acid chlorides with diazomethane via the bis(diazoketones) and bis(ketenes), such as for example 3,8-dibutyl-sebacic acid.

It is furthermore also possible to manufacture such dicarboxylic acids of Formula II by subjecting half-ester salts of paraffin-dicarboxylic acids which are substituted by 1 to 3 $C_1$–$C_4$-alkyl groups (for example α-methyladipic acid or β-methyladipic acid) to electrolysis according to H. Kolbe.

Preferably, trimethyladipic acid is used as the dicarboxylic acid (II), and in particular above all the technical isomer mixture of 2,2,4-trimethyladipic acid and 2,4,4-trimethyladipic acid which is accessible by oxidative ring splitting of isophorone.

The new diglycidyl esters or di-β-methylglycidyl esters according to the invention of Formula I react with the usual curing agents for polyepoxide compounds and can therefore be crosslinked or cured by adding such curing agents analogously to other polyfunctional epoxide compounds or epoxide resins. Possible curing agents of this kind are basic or acid compounds.

As suitable curing agents, there may for example be mentioned: amines or amides, such as aliphatic, cycloaliphatic or aromatic, primary, secondary or tertiary amines, for example monoethanolamine, ethylenediamine, hexamethylenediamine, trimethylhexamethylenediamine, diethylenetriamine, triethylenetetramine, tetraethylenepentamine, N,N - dimethylpropylenediamine-1,3,N,N-diethylpropylenediamine-1,3,bis(4 - amino - 3 - methyl - cyclohexyl)metane, 3,5,5 - trimethyl - 3-(aminomethyl)cyclohexylamine ("isophoronediamine"), Mannich bases, such as 2,4,6-tris(dimethylaminomethyl)phenol; m-phenylenediamine, p-phenylenediamine, bis(4-aminophenyl) methane, bis(4-aminophenyl)sulphone, m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts from polyamines, such as diethylenetriamine or triethylenetetramine, in excess and polyepoxides such as diomethane-polyglycidyl ethers; ketimines, for example from acetone or methyl ethyl ketone and bis(p-aminophenyl)methanes; adducts from monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid ("Versamid"); polymeric polysulphides ("Thiokol"); dicyandiamide, aniline-formaldehyde resins;

polyhydric phenols, for example resorcinol, 2,2-bis(4-hydroxyphenyl)propane or phenol-formaldehyde resins; boron trifluoride and its complexes with organic compounds, such as BF₃-ether complexes and BF₃-amine complexes, for example BF₃-monoethylamine complex; acetoacetanilide-BF₂ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endo-methylene-$\Delta^4$-tetrahydrophthalic anhydride, 4-methyl-3,6-endomethylene-$\Delta^4$-tetrahydrophthalic anhydride (=methylnadic anhydride), 3,4,5,6,7,7 - hexachlor - 3,6 - endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic anhydride or mixtures of such anhydrides.

It is furthermore possible to use cure accelerators in the cure reaction, and in particular especially when using polyamides, dicyandiamide, polymeric polysulphides or polycarboxylic acid anhydrides as curing agents; such accelerators are for example tertiary amines, their salts or quaternary ammonium compounds, for example 2,4,6-tris-(dimethylaminomethyl)phenol, benzyldimethylamine, 2-ethyl-4-methylimidazole, 4-aminopyridine, triamylammonium phenolate; or alkali metal alcoholates such as for example sodium hexane triolate.

The term "curing" as used here denotes the conversion of the abovementioned diepoxides into insoluble and infusible crosslinked products, and in particular as a rule with simultaneous shaping to give mouldings such as castings, pressings or laminates and the like, or to give "two-dimensional structures" such as coatings, coverings, lacquer films or adhesive bonds.

Depending on the choice of the curing agent, the cure can be effected at room temperature (18–25° C.) or at elevated temperature (for example 50–180° C.). As already mentioned initially, it is possible, because of the surprisingly high reactivity of the new diglycidyl esters or di-$\beta$-methylglycidyl esters according to the invention, to achieve complete cure with a given type of curing agent as a rule already at significantly lower temperatures than for most hitherto known epoxide resins.

The cure can optionally also be carried out in two stages by first prematurely stopping the cure reaction, or effecting the first stage at only moderately elevated temperature, whereby a curable pre-condensate which is still fusible and soluble (a so-called "B-stage") is obtained from the epoxide component and the curing agent component. Such a pre-condensate can for example serve for the manufacture of "prepregs," compression moulding compositions or sintering powders. Since the new diglycidyl esters or di-$\beta$-methylglycidyl esters, and in particular above all trimethyladipic acid diglycidyl ester, are liquids of more or less low viscosity, they are also—as mentioned initially—outstandingly suitable for use as reactive diluents for epoxide resins and can therefore advantageously be used in mixtures with other curable diepoxide or polyepoxide compounds. As such there may for example be mentioned: polyglycidyl ethers or poly-($\beta$-methylglycidyl) ethers of polyhydric alcohols such as polyethylene glycols, polypropylene glycols or 2,2-bis-(4'-hydroxycyclohexyl)-propane; polyglycidyl ethers or poly-($\beta$-methylglycidyl)-ethers of polyhydric phenols, such as 2,2-bis-(4'-hydroxyphenyl)-propane (=diomethane), 2,2-bis-(4'-hydroxy-3',5'-dibromophenyl)-propane, bis-(4 - hydroxyphenyl)-sulphone, 1,1,2,2-tetrakis-(4-hydroxyphenyl)-ethane or condensation products of formaldehyde with phenols, manufactured in an acid medium, such as phenol novolacs or cresol novolacs; polyglycidyl esters or poly-($\beta$-methylglycidyl) esters of polycarboxylic acids such as for example phthalic acid diglycidyl ester, isophthalic acid diglycidyl ester, $\Delta^4$-tetrahydrophthalic acid diglycidyl ester or hexahydrophthalic acid diglycidyl ester; triglycidyl isocyanurate, N,N'-diglycidyl-5,5-dimethylhydantoin, aminopoly-epoxides such as are obtained by dehydrohalogenation of the reaction products from epihalogenohydrin or $\beta$-methylepihalogenohydrin and primary or secondary amines such as aniline or 4,4'-diaminodiphenylmethane; and furthermore alicyclic compounds containing several epoxide groups, such as vinylcyclohexene diepoxide, dicyclopentadiene diepoxide, ethylene glycol-bis-(3,4-epoxytetrahydrodicyclopentadien-8-yl)-ether,
(3',4'-epoxycyclohexylmethyl)-3,4-epoxycyclohexanecarboxylate,
(3',4'-epoxy-6'-methylcyclohexylmethyl)-3,4-epoxy-6-methylcyclohexanecarboxylate,
bis-(2,3-epoxy-cyclopentyl)-ether or
3-(3',4'-epoxycyclohexyl)2,4-dioxaspiro-(5,5)-9,10-epoxyundecane.

If desired, other known reactive diluents, such as for example styrene oxide, butylglycidyl ether, isooctylglycidyl ether, phenylglycidyl ether, cresylglycidyl ether, or glycidyl esters of synthetic highly branched mainly tertiary aliphatic monocarboxylic acids ("Cardura E") can be used conjointly.

The subject of the present invention are therefore also curable mixtures which are suitable for the manufacture of mouldings including two-dimensional structures and which contain the diglycidyl esters or di-$\beta$-methylglycidyl esters according to the invention, optionally together with other diepoxide or polyepoxide compounds, and also curing agents for epoxide resins, such as polyamines or polycarboxylic acid anhydrides.

The diepoxides according to the invention or their mixtures with other polyepoxide compounds and/or curing agents can further, at any stage before cure, be mixed with usual modifiers, such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention there may for example be mentioned: coal tar, bitumen, textile fibres, glass fibres, asbestos fibres, boron fibres, carbon fibres, cellulose, polyethylene powder, polypropylene powder; quartz powder, mineral silicates such as mica, asbestos powder, slate powder; kaolin, aluminium oxide trihydrate, chalk powder, gypsum, antimony trioxide, bentones, silica aerogel ("Aerosil"), lithopone, barytes, titanium dioxide, carbon black, graphite, oxide pigments such as iron oxide, or metal powders such as aluminium powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, ethylene glycol monoethyl ether and ethylene glycol monobutyl ether.

As plasticisers, dibutyl, dioctyl and dinonyl phthalate, tricresyl phosphate, trixylenyl phosphate, and also polypropylene glycols, can for example be used for modifying the curable mixtures.

As flow control agents, silicones, cellulose acetobutyrate, polyvinyl butyral, waxes, stearates and the like (which are in part also employed as mould release agents) can for example be added when employing the curable mixtures, especially in surface protection.

Especially for use in the lacquer field, the diepoxide compounds can furthermore be partially esterified in a known manner with carboxylic acids such as especially higher unsaturated fatty acids. It is furthermore possible to add other curable cynthetic resins, for example phenoplastics or aminoplastics, to such lacquer resin formulations.

The curable mixtures according to the invention can be manufactured in the usual manner with the aid of known mixing equipment( stirrers, kneaders, rolls and the like).

The curable epoxide resin mixtures according to the invention are above all employed in the fields of surface protection, electrotechnology, laminating processes and building. They can be used in a formulation in each case suited to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates. Apart from being suitable for use as curable components in epoxide resin mixtures, the new diglycidyl esters or di-β-methylglycidyl esters (I) are also suitable for use as plasticisers or stabilisers for high molecular polymers such as for example polyvinyl chloride, and for use as auxiliary agents for the creaseproofing or shrinkproofing of textiles.

In the examples which follow the parts denote parts by weight and the percentages denote percentages by weight, unless otherwise stated. The relationship of parts by volume to parts by weight is as of the millilitre to the gram.

EXAMPLES OF MANUFACTURE

Example 1

7.5 kg. of technical trimethyladipic acid (isomer mixture of 2,2,4-trimethyladipic acid and 2,4,4-trimethyladipic acid) are mixed with 37 kg. of epichlorhydrin in a reaction vessel and warmed to 85° C. 30 g. of aqueous 50% strength sodium hydroxide solution and 350 g. of aqueous 50% strength tetramethylammonium chloride solution are added. The exothermic reaction which follows is counterbalanced by cooling with water and the course of the reaction is monitored with the aid of a pH-electrode. After 1 to 1½ hours the recording on the pH measuring instrument rises abruptly within a short time by about 2 pH units, which indicates the end of the addition reaction. The reaction mixture is cooled to 55° C. and a further 150 g. of aqueous 50% strength tetramethylammonium chloride solution are added. The apparatus is placed under vacuum and 7 kg. of aqueous 50% strength sodium hydroxide solution are allowed to run in at 70–90 mm. Hg and an internal temperature of 52–58° C. over the course of 80 to 120 minutes, with the water introduced and the water formed distilling off azeotropically with epichlorhydrin. The epichlorhydrin, separated from the water in a phase separation vessel, is continuously returned to the reaction mixture. For working-up, the reaction mixture is succesively washed with water, neutralised to pH 5–6 with aqueous monosodium phosphate solution and again washed with water. After distilling off the epichlorhydrin, 11.7 kg. (97.5% of theory) of liquid trimethyladipic acid diglycidyl ester remain, having the following physical and analytical data:

Viscosity according to Hoeppler: 44 centipoises (25° C.)
Epoxide group content: 6.5 epoxide equivalents/kg. (97.5% of theory)
Chlorine content: 0.5%

Example 2

A concentrated solution was manufactured from 160 g. of aqueous 50% strength sodium hydroxide solution (=2 mols), 188 g. of technical trimethyladipic acid, consisting of an isomer mixture, according to Example 1 (=1 mol) and water, and was continuously added dropwise over the course of 2½ hours to 1850 g. of epichlorhydrin (=20 mols) and 4 g. of benzyltrimethylammonium chloride (=0.2% relative to the total weight). The temperature of the reaction mixture was kept at between 110 and 112° C., at which temperature an azeotropic mixture of epichlorhydrin and water distilled off. After separating off the water in a phase separation vessel, the epichlorhydrin was again returned from the distillate to the reaction mixture. In this way the concentration of water in the reaction mixture was kept at between 0.5 and 1%. After the reaction, the epichlorhydrin solution was washed as in Example 1 until it was neutral and free of salt, and was concentrated, initially under a partial vacuum and finally at 15 mm. Hg.

200 g. (67% of theory) of liquid trimethyladipic acid diglycidyl ester were obtained, having the following physical and analytical data:

Viscosity according to Hoeppler: 90 centipoises (25° C.)
Epoxide group content: 6.0 epoxide equivalents/kg. 90% of theory)
Chlorine content: 1.4%

Example 3

A mixture of 160 g. of aqueous 50% strength sodium hydroxide solution (=2 mols) and 188 g. of technical trimethyladipic acid consisting of an isomer mixture, in accordance with Example 1 (=1 mol), were concentrated to dryness in vacuo in a rotary evaporator. 232 g. of the dry salt (=1 mol) were suspended in 1850 g. of epichlorhydrin (20 mols) and 8 g. of tetramethylammonium chloride (=0.4% relative to the total weight) were added. The suspension was boiled for 1 hour under reflux and thereafter the unreacted epichlorhydrin was distilled off, initially under a partial vacuum and then at 15 mm. Hg in a rotary evaporator. The residue was cooled, then extracted three times with 200 ml. of methyl isobutyl ketone at a time, and filtered to remove sodium chloride. Thereafter the methyl isobutyl ketone solution was twice washed with 150 ml. of water to remove possible catalyst residues. After distilling off the solvent 270 g. (90% of theory) of trimethyladipic acid diglycidyl ester remain having the following physical and analytical data:

Viscosity according to Hoeppler: 70 centipoise (25° C.)
Epoxide group content: 6.1 epoxide equivalents per kg. (92% of theory)
Chlorine content: 1.7%

Example 4

50 g. of 2,5-dimethyladipic acid (0.287 mol) were dissolved at 90° C. in 266 g. (2.87 mols) of epichlorhydrin. In order to catalyse the addition of epichlorhydrin to 2,5-dimethyladipic acid, 1.4 g. (0.0175 mol) of aqueous 50% strength sodium hydroxide solution and 2.2 g. of aqueous 50% strength tetramethylammonium chloride solution were added. A slightly exothermic reaction occurred and the course of the reaction was pursued with the aid of a pH-electrode. After 35 minutes at 80° C. the pH rose rapidly within a short time and then remained almost constant. The reaction mixture was cooled to 58° C. and the apparatus was placed under vacuum. At 70–90 mm. Hg and an internal temperature of 54–58° C., 53 g. (0.66 mol) of aqueous 50% strength sodium hydroxide solution (115% of theory) were run in over the course of 1 hour, with the water introduced and the water formed simultaneously distilling off azeotropically with epichlorhydrin. The epichlorhydrin separated from the water in a phase separation vessel was continously returned to the reaction mixture. Working-up took place in the same manner as in Example 1. 75 g. (95% of theory) of 2,5-dimethyladipic acid diglycidyl ester were obtained, having an epoxide content of 6.8 equivalents per kg. (97% of theory), a chlorine content of 0.5% (according to Wurzschmitt), a viscosity of 32 centipoises (according to Hoeppler at 25° C.) and a colour number of 1 (according to Gardner-Holdt).

In contrast to adipic acid diglycidyl ester which crystallises to a solid mass at room temperature even at much lower purity, the product according to Example 4 was stable and even after 3 months still clear and free of crystalline constituents.

Example 5

165 g. (1 mol) of diethylmalonic acid (97% strength) were dissolved in 925 g. (10 mols) of epichlorhydrin at 60° C. 8 g. of aqueous 50% strength tetramethylammonium chloride solution and 4 g. (0.05 mol) of aqueous 50% strength sodium hydroxide solution were added as catalysts for the addition of epichlorhydrin to diethylmalonic acid. The slightly exothermic addition reaction was pursued with a pH-electrode and lasted 33 minutes at 85 to 90° C. Thereafter dehydrohalogenation was carried out over the course of two hours in the same manner as in Example 4 with 176 g. (2.2 mols=110% of theory) of aqueous 50% strength sodium hydroxide solution at 55° C. with simultaneous azeotropic distillation at 80 mm. Hg. The product was worked-up by washing, neutralising and concentrating as in Example 1. 252 g. (96.2% of theory) of liquid diethylmalonic acid diglycidyl ester were obtained, having an epoxide content of 7.0 equivalents/kg. (95.3% of theory), a chlorine content of 0.45% (according to Wurzschmitt), a viscosity of 31 centipoises (according to Hoeppler at 25° C.) and a colour number of 2 according to Gardner-Holdt). The product is storage-stable and was still clear and free of crystalline constituents after one year.

Example 6

161 g. (1 mol) of 2,2-dimethylglutaric acid were dissolved at 80° C. in 925 g. (10 mols) of epichlorhydrin, subjected to catalytic addition in the same manner as in Example 5, using 8 g. of aqueous 50% strength tetramethylammonium chloride solution and 4 g. of aqueous 50% strength sodium hydroxide solution, dehydrohalogenated with 176 g. (2.2 mols) of aqueous sodium hydroxide solution and worked-up. 251 g. (92% of theory) of mobile 2,2-dimethylglutaric acid diglycidyl ester having an epoxide content of 6.9 equivalents/kg. (94% of theory), a chlorine content of 0.47% (according to Wurzschmitt), a viscosity of 28 centipoises (according to Hoeppler, at 25° C.) and a colour number of 1 (according to Gardner-Holdt) were obtained. The product was storage-stable and was still clear and free of crystalline constituents after 9 months.

Example 7

157 g. (0.5 mol) of α,α'-dibutylsebacic acid were dissolved in 555 g. (6.0 mols) of epichlorhydrin at 100° C. For the addition of the epichlorhydrin to α,α'-dibutylsebacic acid, 3 g. of aqueous 50% strength tetramethylammonium chloride solution were added at 90° C. and the pH course of the reaction mixture was observed. After 33 minutes at 90° C. an abrupt rise in pH took place. The reaction mixture was thereafter cooled to 54° C. The dehydrohalogenation with 88 g. (1.1 mols, 110% of theory) of aqueous 50% strength sodium hydroxide solution, and the working-up, took place in the same manner as in Example 1. 207 g. (97% of theory) of α,α'-dibutylsebacic acid diglycidyl ester having an epoxide content of 4.3 equivalents/kg. (92% of theory), a chlorine content of 0.6% (according to Wurzschmitt), a viscosity of 66 centipoises (according to Hoeppler at 25° C.) and a colour number of 3 (according to Gardner-Holdt) were obtained.

In contrast to sebacic acid diglycidyl ester of comparable purity which at room temperature immediately crystallised to a solid block, the product manufactured in accordance with this example was stable at room temperature and even after several months was clear and free of crystalline constituents.

Example 8

215 g. (0.5 mol) of α,α'-dimethylsebacic acid were dissolved in 555 g. (6 mols) of epichlorhydrin at 100° C., catalytically subjected to addition in the same manner as in Example 7, using 3 g. of aqueous 50% strength tetramethylammonium chloride solution at 90° C., dehydrohalogenated with 88 g. (1.1 mols=110% of theory) of aqueous 50% strength sodium hydroxide solution, and worked-up. 163 g. (95.2% of theory) of liquid α,α'-dimethylsebacic acid diglycidyl ester having an epoxide content of 5.4 equivalents/kg. (92.5% of theory), a chlorine content of 0.7% (according to Wurzschmitt), a viscosity of 60 centipoises (according to Hoeppler at 25° C.) and a colour number of 2 (according to Gardner-Holdt) were obtained. The product was storage-stable and still clear and free of crystalline constituents after several months.

Example 9

188.5 g. (1 mol) of trimethyladipic acid (technical isomer mixture) were dissolved in 925 g. (10 mols) of epichlorohydrin at 90° C. 8 g. (0.1 mol) of 50% strength aqueous sodium hydroxide solution were added as the catalyst for the addition of epichlorhydrin to trimethyladipic acid and the pH course was observed. After 2 hours at 90–95° C. the addition was complete. The dehydrohalogenation with 176 g. (2.2 mols) of aqueous 50% strength sodium hydroxide-solution, and the working-up, took place as in Example 1. 277 g. (92% of theory) of liquid trimethyladipic acid diglycidyl ester (isomer mixture) were obtained, having an epoxide content of 6.15 equivalents/kg. (92.5% of theory), a viscosity of 50 centipoises (according to Hoeppler, at 25° C.) and a chlorine content of 0.8% (according to Wurzschmitt).

Example 10

153 g. (0.8 mol) of trimethyladipic acid (technical isomer mixture; 98% strength according to titration) were dissolved at 100° C. in 850 g. (8 mols) of β-methylepichlorhydrin, subjected to addition in the same manner as in Example 5, using 4 g. (0.05 ml) of aqueous 50% strength sodium hydroxide solution and 6 g. of aqueous 50% strength tetramethylammonium chloride solution, at 100° C. over the course of 25 minutes whilst controlling with a pH electrode, and dehydrohalogenated with 147 g. (1.84 mols, 115% of theory) of aqueous 50% strength sodium hydroxide solution at 55° C. with simultaneous azeotropic distillation at 80 mm. Hg over the course of 2 hours. After working-up by washing, neutralising and concentrating, 245 g. (93% of theory) of mobile trimethyladipic acid di-β-methylglycidyl ester (isomer mixture) were obtained, having an epoxide content of 5.9 equivalents/kg. (97% of theory), a viscosity of 48 centipoises (according to Hoeppler, at 25° C.), and a chlorine content of 0.4%.

Example 11

165 g. (1 mol) of diethylmalonic acid (97% strength) were dissolved at 90° C. in 1065 g. (10 mols) of β-methylepichlorhydrin and subjected to addition, dehydrohalogenated and worked-up in the same manner as in Example 5. 293 g. (96% of theory) of liquid diethylmalonic acid di-β-methylglycidyl ester were obtained, having an epoxide content of 6.35 equivalents/kg. (97% of theory), a chlorine content of 0.35% (according to Wurzschmitt) and a viscosity of 37 centipoises (according to Hoeppler, at 25° C.).

USE EXAMPLES

In the use examples which follow, the following epoxide resins and the following cure accelerators were employed as comparison substances and as additives to the diglycidyl esters according to the invention:

Epoxide Resin A

Polyglycidyl ether resin (technical product) which is liquid at room temperature, manufactured by condensation of diomethane (2,2-bis(p-hydroxyphenyl)-propane) with a stoichiometric excess of epichlorhydrin in the presence of alkali, mainly consisting of diomethane-diglycidyl ether of formula

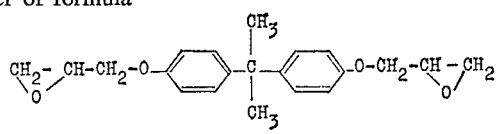

and having the following physical and analytical data:

Epoxide content: 5.3 epoxide equivalents/kg.
Viscosity according to Hoeppler, at 25° C.: 9500 cp.

Epoxide Resin B

Cycloaliphatic epoxide resin (technical product) which is of fluid viscosity at room temperature and mainly consists of the diepoxide of formula

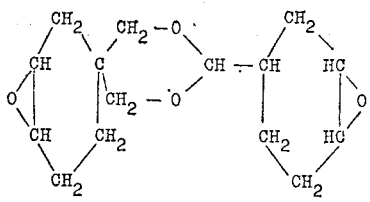

(=3-(3',4'-epoxycyclohexyl)-2,4 - dioxaspiro(5.5) - 8,9-epoxyundecane), having the following physical and analytical data:

Epoxide content: about 6.6 epoxide equivalents/kg.
Viscosity according to Hoeppler, at 25° C.: 75,000 cp.

Epoxide Resin C

Adipic acid diglycidyl ester; the technical product (white crystal mass) has the following physical and analytical data:

Epoxide content: 7.1 epoxide equivalents/kg.
Chlorine content: 1.6%
Viscosity according to Hoeppler of the supercooled melt at 25° C.: 60 centipoises
Melting point: 45–50° C.

Epoxide Resin D 1,4-butanediol-diglycidyl ether; the technical product has the following physical and analytical data:

Epoxide group content: 7.8 epoxide equivalents/kg.
Chlorine content: 8%
Viscosity according to Hoeppler at 25° C.: about 18 cp.

Accelerator (a)

2,4,6-tris-(dimethylaminomethyl)-phenol.

Accelerator (b)

Approximately 1% strength solution of metallic sodium in 2,4-hydroxy-3-(hydroxymethyl)-pentane.

In order to determine the mechanical and electrical properties of the curable mixtures described in the examples which follow, sheets of 135 x 135 x 4 mm. were manufactured for determining the flexural strength, deflection, impact strength and water absorption; identical sheets but of 3 mm. thickness were manufactured for measuring the loss factor tg δ. The test specimens (60 x 10 x 4 mm.) for determining the water absorption and for the flexural test and impact test (VSM 77,103 and VSM 77,105 respectively) were machined from the sheets, whilst for the tensile test the appropriate test specimen according to VSM 77,101, Fig. 2 (4 mm. thick sample rod) were manufactured directly.

Test specimens of dimensions 120 x 15 x 10 mm. were in each case cast for determining the heat distortion point according to Martens (DIN 53,458).

Sheets of dimensions 120 x 120 x 4 mm. were cast for testing the arcing resistance and tracking resistance (VDE 0303).

EXAMPLE I (a) 100 parts of the liquid trimethyladipic acid diglycidyl ester (isomer mixture) manufactured in Example 1, having an epoxide content of 6.5 epoxide equivalents/kg., are homogeneously mixed at room temperature with 43 parts of bis(4-amino-3-methylcyclohexyl)methane as the curing agent. The mixture was poured into aluminium moulds and, in a first test series, was allowed to cure for 10 days at room temperature (about 20–23° C.). After removal from the mould, the properties of the test specimens were determined. In a second test series the samples were cured in accordance with the following cycle: 24 hours at room temperature (about 20–23° C.) and subsequently 16 hours at 60° C.

Table 1 below gives the properties of the castings for both series of tests:

TABLE 1

| | Cure | |
|---|---|---|
| | 10 days, 20–23° C. | 24 hours, 20–23° C. +16 hours, 60° C. |
| Flexural strength, kg./mm.² (according to VSM 77,103) | [1] >8.0 | [1] >8.0 |
| Deflection, mm. (according to VSM 77,103) | [1] >20 | [1] >20 |
| Impact strength, kg. cm./cm.² (according to VSM 77,105) | >25 | 15 |
| Heat distortion point, ° C. (according to Martens DIN 53,458) | 52 | 54 |
| Water absorption in percent, 4 days, 20° C., test specimens 60 x 10 x 4 mm. | 0.40 | 0.40 |

[1] No fracture on maximum deflection.

(b) For comparison, a curable mixture was manufactured from 100 parts of adipic acid diglycidyl ester (=epoxide resin C) and an equivalent quantity of bis(4-amino-3-methylcyclohexyl) methane (46 parts). The mixture was cured analogously to the description given under (a) above. After curing for 10 days at room temperature the test specimens had cured insufficiently so that no properties could be determined.

After a curing cycle of 24 hours at room temperature (20–23° C.) and 16 hours at 60° C. the castings had the following properties:

Flexural strength, kg./mm.² (according to VSM 77,103) _____ [1] >8
Deflection, mm. (according to VSM 77,103 ) _____ [1] >20
Impact strength kg. cm./cm.² (according to VSM 77,105) _____ >25
Heat distortion point, ° C.: (according to Martens DIN 53,458) _____ 45
Water absorption in percent, 4 days, 20° C., test specimens 60 x 10 x 4 mm. _____ 0.81

[1] No fracture on maximum deflection.

The water absorption at 20° C. is twice as great as for the castings from trimethyladipic acid diglycidyl ester.

EXAMPLE II 100 parts of the liquid trimethyladipic acid diglycidyl ester manufactured in Example 1 are homogeneously mixed with 30 parts of 3-aminomethyl-3,5,5-trimethyl-1-cyclohexylamine ("isophorone diamine"). The mixture is poured into moulds and in a first test series is allowed to cure for 10 days at room temperature (20–30° C.).

In a second test series the samples are cured in accordance with the following cycle: 24 days at room temperature and subsequently 12 hours at 60° C. Table 2 below gives the properties of the castings for both series of tests:

TABLE 2

| | Cure | |
|---|---|---|
| | 10 days, 20–23° C. | 24 hours, 20–23° C. +12 hours, 60° C. |
| Flexural strength, kg./mm.² (according to VSM 77,103) | 9.5 | 9 |
| Deflection, mm. (according to VSM 77,103) | 18 | 16 |
| Impact strength, kg. cm./cm.² (according to VSM 77,105) | 8 | 7.5 |
| Heat distortion point, ° C. (according to Martens DIN 53,458) | 48 | 50 |
| Water absorption in percent, 4 days, 20° C., test specimens 60 x 10 x 4 mm. | 0.61 | 0.57 |

EXAMPLE III 34 parts of 4,4'-diaminodiphenyl-methane are homogeneously dissolved at 60° C. in 100 parts of the liquid trimethyladipic acid diglycidyl ester manufactured in Example 1. The mixture is poured into moulds and, in a first test series, is cured for 24 hours at 60° C. In a second test series the samples are cured in accordance with the following cycle: 24 hours at 60° C. and subsequently 6 hours at 80° C.

Table 3 below gives the properties of the castings for both test series:

TABLE 3

| | Cure | |
| --- | --- | --- |
| | 24 hours, 60° C. | 24 hours, 60° C. +6 hours, 80° C. |
| Flexural strength, kg./mm.² (according to VSM 77,103) | 10 | 9.8 |
| Deflection, mm. (according to VSM 77,103) | 18 | 18 |
| Impact strength kg. cm./cm.² (according to VSM 77,105) | >25 | 25 |
| Heat distortion point, ° C. (according to Martens DIN 53,458) | 58 | 61 |
| Water absorption in percent, 4 days, 20° C., test specimens 60 x 10 x 4 mm | 0.37 | 0.45 |

EXAMPLE IV (a) 100 parts of the liquid trimethyladipic acid ester manufactured in Example 1 are homogeneously mixed with 100 parts of hexahydrophthalic acid anhydride as the curing agent and 0.2 part of benzyldimethylamine as the accelerator at 60° C. The mixture is cast into aluminium moulds and, in a first test series, is cured for 16 hours at 60° C. In a second test series the samples are cured in accordance with the following cycle: 16 hours at 60° C. and 12 hours at 120° C.

Table 4 below gives the properties of the castings for both test series:

TABLE 4

| | Cure | |
| --- | --- | --- |
| | 16 hours at 60° C. | 16 hours, 60° C., 12 hours, 120° C. |
| Flexural strength, kg./mm.² (according to VSM 77,103) | 12.3 | 12.5 |
| Deflection, mm. (according to VSM 77,103) | 12.2 | 12.1 |
| Impact strength, kg. cm./cm.² (according to VSM 77,105) | 7.6 | 8.7 |
| Heat distortion point, ° C. (according to Martens DIN 53,458) | 62 | 65 |
| Water absorption in percent, 1 hour at 100° C., test specimens 60 x 10 x 4 mm | 0.60 | 0.60 |
| Water absorption in percent, 4 days at 20° C., test specimens 60 x 10 x 4 mm | 0.27 | 0.28 |

(b) For comparison, a curable mixture was manufactured from 100 parts of adipic acid diglycidyl ester (=epoxide resin C) and 100 parts of hexahydrophthalic acid anhydride and 0.2 part of benzyldimethylamine. The mixture was cured analogously to the description under (a) above.

After curing for 16 hours at 60° C. the test specimens were insufficiently cured so that no properties could be determined.

After a curing cycle of 16 hours at 60° C. and 12 hours at 120° C. the castings had the following properties:

Flexural strength, kg./mm.² (according to VSM 77,103) _____ 10.8
Deflection, mm. (according to VSM 77,103) _____ 13.5
Impact strength kg./cm.² (according to VSM 77,105) _____ 7.7
Heat distortion point, °C. (according to Martens DIN 53,458) _____ 58
Water absorption in percent, 1 hour at 100° C., test specimens 60 x 10 x 4 mm. _____ 0.96
Water absorption in percent, 4 days at 20° C., test specimens 60 x 10 x 4 mm. _____ 0.52

The water absorption at 20° C. is almost twice as great as for the castings from trimethyladipic acid diglycidyl ester.

EXAMPLE V (a) 80 parts of epoxide resin A (viscosity about 9500 cp. at 25° C.) are mixed with 20 parts of the trimethyladipic acid diglycidyl ester manufactured in Example 1. The resulting liquid resin mixture has a viscosity according to Hoeppler of 1800 cp. at 25° C. and an epoxide content of 5.5 epoxide equivalents/kg. 100 parts of this mixture are homogeneously mixed at 80° C. with 82 parts of hexahydrophthalic anhydride and 0.8 part of accelerator (a) (2,4,6-tris(dimethylaminomethyl)phenol). The curable mixture (sample 1) is cast into aluminium moulds and cured for 6 hours at 80° C. and subsequently for 6 hours at 120° C.

For comparison, a known curable mixture (sample 2) is manufactured from 100 parts of epoxide resin A, 80 parts of hexahydrophthalic anhydride and 0.8 part of accelerator (b); castings are manufactured from this mixture in accordance with the same curing cycle (6 hours at 80° C. plus 6 hours at 120° C.).

The properties of the mouldings can be seen from Table 5 below:

TABLE 5

| | Sample 1 | Sample 2 |
| --- | --- | --- |
| Epoxide resin A, parts | 80 | 100 |
| Glycidyl ester according to Example 1, parts | 20 | |
| Hexahydrophthalic anhydride, parts | 82 | 80 |
| Accelerator (a), parts | 0.8 | 0.8 |
| Flexural strength, kg./mm.², (according to VSM 77,103) | 13.8 | 13.5 |
| Deflection, mm. (according to VSM 77,103) | 13.0 | 9.6 |
| Impact strength, kg. cm./cm.² (according to VSM 77,105) | 8.6 | 6.3 |
| Heat distortion point, ° C. (according to Martens DIN 53,468) | 88 | 94 |
| Water absorption in percent, 4 days at 20° C., test specimens, 60 x 10 x 4 mm | 0.24 | 0.22 |
| Tensile strength, kg./mm.² (according to VSM 77,101) | 6.2 | 5.2 |
| Elongation at break in percent (according to DIN 53,455) | 5.5 | 3.5 |
| Tensile shear strength, kg./mm.² (according to DIN 53,283) | 1.7 | 1.2 |

It is noteworthy that most mechanical properties are better in the case of sample 1 according to the invention than in the case of the known sample 2, since the lowering of the viscosity, for improving the technical processing properties, by adding reactive diluents as a rule results in a worsening of the mechanical properties of the cured mouldings.

(b) 29 parts of 4,4'-diaminodiphenylmethane are dissolved at 60° C. in 100 parts of the mixture, used in Example V(a), of 80 parts of epoxide resin A and 20 parts of trimethyladipic acid diglycidyl ester. The resulting curable mixture (sample 3) is poured into casting moulds and cured for 16 hours at 120° C.

For comparison, a known curable mixture (sample 4) is manufactured from 100 parts of epoxide resin A and 27 parts of 4,4'-diaminodiphenylmethane; castings are manufactured from this mixture under the same curing conditions (16 hours at 120° C.).

The properties of the mouldings can be seen from Table 6 below:

TABLE 6

| | Sample 3 | Sample 4 |
| --- | --- | --- |
| Epoxy resin A, parts | 80 | 100 |
| Diglycidyl ester according to Example 1, parts | 20 | |
| 4,4'-diaminodiphenylmethane, parts | 29 | 27 |
| Flexural strength, kg./mm.,² (according to VSM 77,103) | 13.8 | 11.0 |
| Deflection, mm. (according to VSM 77,103) | 12.3 | 10.8 |
| Impact strength, kg. cm./cm.² (according to VSM 77,105) | 16.8 | 10.0 |
| Heat distortion point, ° C. (according to Martens DIN 53,468) | 114 | 129 |
| Water absorption in percent, 4 days at 20° C., test specimens 60 x 10 x 4 mm | 0.35 | 0.35 |
| Tensile strength, kg./mm.² (according to VSM 77,101) | 6.5 | 6.0 |
| Elongation at break in percent (according to DIN 53,455) | 5.5 | 4 |
| Tensile shear strength, kg./mm.² (according to DIN 53,283) | 1.5 | 1.0 |

EXAMPLE VI 70 parts of epoxide resin A (viscosity about 9,500 cp. at 25° C.) are mixed with 30 parts of the trimethyladipic acid diglycidyl ester manufactured in Example 1. The resulting liquid resin mixture has a viscosity according to Hoeppler of about 1000 cp. at 25° C. and an epoxide content of 5.65 epoxide equivalents/kg.

100 parts of this mixture are homogeneously mixed with 14 parts of triethylenetetramine as the curing agent, at room temperature (20–23° C.). The curable mixture (sample 5) is poured into aluminium moulds and, in a first test series, is allowed to cure for 4 days at room temperature (20–23° C.).

In a second test series the castings are subsequently to curing for 4 days at room temperature additionally subjected to a post-cure for 1 hour at 100° C.

For comparison, a curable mixture is manufactured from 70 parts of epoxide resin A, 30 parts of 1,4-butanedioldiglycidyl ether and 15 parts of triethylenetetramine. Castings are manufactured from the curable mixture (sample 6) analogously to the description given above.

The properties of the castings can be seen from Table 7 below:

TABLE 7

| | Sample 5 | Sample 6 |
|---|---|---|
| Epoxide resin A, parts | 70 | 70 |
| Diglycidyl ester according to Example 1, parts | 30 | |
| Epoxide resin D, parts | | 30 |
| Triethylenetetramine, parts | 14 | 15 |
| Properties of the mouldings after curing at room temperature (4 days): | | |
| Flexural strength, kg./mm.² (according to VSM 77,103) | 12.0 | 8.6 |
| Deflection, mm. (according to VSM 77,103) | 12.1 | 5.0 |
| Impact strength, kg. cm./cm.² (according to VSM 77,105) | 7.3 | 5.6 |
| Heat distortion point, ° C. (according to Martens DIN 53,458) | 64 | 44 |
| Properties of the mouldings after curing at room temperature (4 days) and post-curing at 100° C. (1 hour): | | |
| Flexural strength, kg./mm.² (according to VSM 77,103) | 12.3 | 7.3 |
| Deflection, mm. (according to VSM 77,103) | 11.7 | 4.6 |
| Impact strength, kg. cm./cm.² (according to VSM 77,105) | 9.6 | 4.9 |
| Heat distortion point, ° C. according to Martens DIN 53,458 | 68 | 51 |

EXAMPLE VII 70 parts of epoxide resin B (viscosity about 75,000 cp. at 25° C.) are mixed with 30 parts of the trimethyladipic acid diglycidyl ester manufactured in Example 1. The resulting liquid resin mixture has a viscosity according to Hoeppler of 2000 cp. at 25° C. and an epoxide content of 6.6 epoxide equivalents/kg.

100 parts of this mixture are homogeneously mixed at 80° C. with 83 parts of hexahydrophthalic anhydride and 6 parts of accelerator (b) (sodium alcoholate of 2,4-hydroxy-3-hydroxymethylpentane, 1% strength). The curable mixture (sample 7) is poured into aluminium moulds and cured for 6 hours at 80° C. and subsequently for 14 hours at 120° C.

For comparison, a known curable mixture (sample 8) is manufactured from 100 parts of epoxide resin B, 83 parts of hexahydrophthalic anhydride and 6 parts of accelerator (b); castings are manufactured from this mixture in accordance with the same curing cycle (6 hours at 80° C. plus 14 hours at 120° C.).

The properties of the mouldings can be seen from the following Table 8:

TABLE 8

| | Sample 7 | Sample 8 |
|---|---|---|
| Epoxide resin B, parts | 70 | 100 |
| Diglycidyl ester according to Example 1, parts | 30 | |
| Hexahydrophthalic anhydride, parts | 83 | 83 |
| Accelerator (b), parts | 6 | 6 |
| Flexural strength, kg./mm.² (according to VSM 77,103) | 11.2 | 9.5 |
| Deflection, mm. (according to VSM 77,103) | 7.2 | 5.5 |
| Impact strength, kg. cm./cm.² (according to VSM 77,105) | 14.8 | 8.8 |
| Heat distortion point, ° C. (according to Martens DIN 53,458) | 141 | 151 |
| Tensile strength, kg./mm.² (according to VSM 77,101) | 5.6 | 3.4 |
| Elongation at break in percent (according to DIN 53,455) | 1.6 | 1.2 |
| Water absorption in percent, 4 days at 20° C., test specimens 60 x 10 x 4 mm | 0.31 | 0.37 |
| Tracking resistance, level (according to VDE 0303) | Ka 3c | Ka 3c |
| Arcing resistance, level (according to VDE 0303) | L 4 | L 4 |
| Loss factor, Tgδ at 20° C., 50 Hz (according to VDE 0303) | 0.004 | 0.004 |

EXAMPLE VIII 117 parts of the liquid 2,5-dimethyladipic acid diglycidyl ester manufactured in Example 4 are homogeneously mixed at 60° C. with 123 parts of hexahydrophthalic anhydride as the curing agent and 0.23 part of benzyldimethylamine as the cure accelerator. The mixture is poured into aluminium moulds, and cured for 16 hours at 60° C. and subsequently for 12 hours at 120° C. Table 9 below gives the properties of the castings:

TABLE 9

| | |
|---|---|
| Flexural strength, kg./mm.² (according to VSM 77,103) | 12.3 |
| Deflection, mm. (according to VSM 77,103) | 8.6 |
| Impact strength, kg. cm./cm.² (according to VSM 77,105) | 17.5 |
| Heat distortion point, ° C. (according to Martens DIN 53,458) | --- |
| Water absorption in percent, 1 hour at 100° C., test specimens 60 x 10 x 4 mm. | 0.6 |
| Tensile strength, kg./mm.² (according to VSM 77,101) | 8.0 |
| Elongation at break, in percent (according to DIN 53,455) | 4.5 |

EXAMPLE IX

The following mixtures were manufactured from trimethyladipic acid di-β-methylglycidyl ester manufactured according to Example 10, poured into aluminium moulds, and cured for 16 hours at 60° C. and subsequently for 12 hours at 120° C.:

| | Parts | |
|---|---|---|
| | Sample 1 | Sample 2 |
| Trimethyladipic acid di-β-methylglycidyl ester | 126.2 | 27.1 |
| Epoxide resin A | | 108.4 |
| Hexahydrophthalic anhydride | 113.5 | 111 |
| Benzyldimethylamine | 0.25 | 0.27 |

Table 10 below gives the properties of the castings:

TABLE 10

| | Sample 1 | Sample 2 |
|---|---|---|
| Flexural strength, kg./mm.² (according to VSM 77,103) | 12.3 | 15.4 |
| Deflection, mm. (according to VSM 77,103) | 6.2 | 10.0 |
| Impact strength, kg. cm./cm.² (according to VSM 77,105) | 10.3 | 9.5 |
| Heat distortion point, ° C. (according to Martens DIN 53,458) | 53 | 79 |
| Water absorption in percent, 4 days at 20° C., test specimens 60 x 10 x 4 mm | 0.17 | 0.16 |
| Tensile strength, kg./mm.² (according to VSM 77,101) | 0.7 | 9.0 |
| Elongation at break in percent (according to DIN 53,455) | 77 | 4.2 |

EXAMPLE X

The following mixtures were manufactured from diethylmalonic acid diglycidyl ester manufactured according to Example 5, poured into aluminium moulds, and cured for 16 hours at 60° C. and subsequently for 12 hours at 120° C.:

|  | Parts | |
|---|---|---|
|  | Sample 1 | Sample 2 |
| Diethylmalonic acid diglycidyl ester | 117 | 27.1 |
| Epoxide resin A | | 108.4 |
| Hexahydrophthalic anhydride | 123 | 115 |
| Benzyldimethylamine | 0.23 | 0.27 |

Table 11 below gives the properties of the castings.

TABLE 11

|  | Sample 1 | Sample 2 |
|---|---|---|
| Flexural strength, kg./mm.² (according to VSM 77,103) | 13.6 | 14.7 |
| Deflection, mm. (according to VSM 77,103) | 9.8 | 10.8 |
| Impact strength, kg. cm./cm.² (according to VSM 77,105) | 10.8 | 12.5 |
| Heat distortion point, ° C. (according to Martens DIN 53,458) | 60 | 87 |
| Water absorption in percent, 4 days at 20° C., test specimens 60 x 10 x 4 mm | 0.19 | 0.16 |
| Water absorption in percent, 1 hour at 100° C., test specimens 60 x 10 x 4 mm | 0.5 | 0.2 |
| Tensile strength, kg./mm.² (according to VSM 77,101) | | 9.5 |
| Elongation at break in percent (according to DIN 53,455) | | 5.8 |

EXAMPLE XI

The following mixtures were manufactured from α,α'-dibutylsebacic acid diglycidyl ester manufactured according to Example 7, cast into aluminium moulds, and cured for 16 hours at 60° C. and subsequently for 12 hours at 120° C.

|  | Parts | |
|---|---|---|
|  | Sample 1 | Sample 2 |
| α,α'-Dibutylsebacic acid diglycidyl ester | 27.1 | 33.7 |
| Epoxide resin A | 108.4 | |
| Hexahydrophthalic anhydride | 104.2 | 21.2 |
| Benzyldimethylamine | 0.27 | 0.07 |

Table 12 below gives the properties of the castings.

TABLE 12

|  | Sample 1 | Sample 2 |
|---|---|---|
| Flexural strength, kg./mm.² (according to VSM 77,103) | 14.5 | 11.0 |
| Deflection, mm. (according to VSM 77,103) | 10.8 | 6.1 |
| Impact strength, kg. cm./cm.² (according to VSM 77,105) | 10.5 | 10.3 |
| Heat distortion point, ° C. (according to Martens DIN 53,458) | 81 | 38 |
| Water absorption in percent, 4 days at 20° C., test specimens 60 x 10 x 4 mm | 0.15 | 0.2 |
| Water absorption in percent, 1 hour at 100° C., test specimens 60 x 10 x 4 mm | 0.2 | 0.8 |
| Tensile strength kg./mm.² (according to VSM 77,101) | 7.3 | 5.0 |
| Elongation at break in percent (according to DIN 53,455) | 3.8 | 4.3 |

EXAMPLE XII 100 parts of the liquid 2,2-dimethylglutaric acid diglycidyl ester manufactured in Example 6 are homogeneously mixed with 100.4 parts of hexahydrophthalic anhydride as the curing agent and 0.2 part of benzyldimethylamine as the cure accelerator at 60° C. The mixture is poured into aluminium moulds, and cured for 4 hours at 80° C., 4 hours at 120° C. and subsequently 14 hours at 140° C.

Table 13 below gives the properties of the casting:

TABLE 13

| | |
|---|---|
| Flexural strength, kg./cm.² (according to VSM 77,103) | 12.2 |
| Deflection, mm. (according to VSM 77,103) | 9.4 |
| Impact strength, kg. cm./cm.² | 5.0 |
| Heat distortion point, ° C. (according to Martens DIN 53,458) | 66 |

What is claimed is:

1. New diglycidyl esters of formula

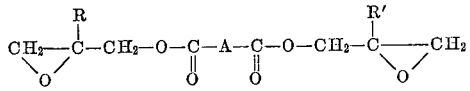

wherein A denotes a linear $C_1$–$C_{10}$-alkylene chain which is substituted by 2 to 3 $C_1$–$C_4$-alkyl groups and R and R' each denote a hydrogen atom or a methyl group.

2. New diglycidyl esters of formula

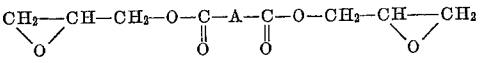

wherein A denotes a $C_3$–$C_{10}$-polymethylene residue which is substituted by 2 to 3 $C_1$–$C_4$-alkyl groups.

3. Technical trimethyladipic acid diglycidyl ester (isomer mixture of 2,2,4-trimethyladipic acid diglycidyl ester and 2,4,4-trimethyladipic acid diglycidyl ester).

4. Diethyl acid diglycidyl ester.

5. Diethylmalonic acid di-β-methylglycidyl ester.

6. 2,2-dimethylglutaric acid diglycidyl ester.

7. 2,5-dimethyladipic acid diglycidyl ester.

8. Technical trimethyladipic acid di-β-methylglycidyl ester (isomer mixture of 2,2,4-trimethyladipic acid di-β-methyl-glycidyl ester and 2,4,4-trimethyladipic acid di-β-methyl-glycidyl ester).

9. α,α'-dimethylsebacic acid diglycidyl ester.

10. α,α'-dibutylsebacic acid diglycidyl ester.

References Cited

UNITED STATES PATENTS

| 3,053,855 | 9/1962 | Maerker et al. | 260—348 |
| 3,057,809 | 10/1962 | Newey | 260—348 X |
| 3,178,454 | 4/1965 | Kloos et al. | 260—348.6 |

NORMA S. MILESTONE, Primary Examiner

U.S. Cl. X.R.

260—30.4 P, 47 EA, 47 EN, 78.4 EP

UNITED STATES PATENT OFFICE
CERTIFICATE OF CORRECTION

Patent No. 3,644,431    Dated February 22, 1972

Inventor(s) ALFRED HEER ET AL

It is certified that error appears in the above-identified patent and that said Letters Patent are hereby corrected as shown below:

Column 18, claim 4, delete "Diethyl" and insert

--- Diethylmalonic ---.

Signed and sealed this 11th day of July 1972.

(SEAL)
Attest:

EDWARD M. FLETCHER, JR.
Attesting Officer

ROBERT GOTTSCHALK
Commissioner of Patents